(12) United States Patent
Sohr et al.

(10) Patent No.: US 12,110,247 B2
(45) Date of Patent: Oct. 8, 2024

(54) METHOD FOR SEPARATING A GLASS ELEMENT AND GLASS SUB-ELEMENT

(71) Applicant: SCHOTT AG, Mainz (DE)

(72) Inventors: David Sohr, Mainz (DE); Clemens Kunisch, Armsheim (DE); Kurt Nattermann, Ockenheim (DE)

(73) Assignee: SCHOTT AG, Mainz (DE)

( * ) Notice: Subject to any disclaimer, the term of this patent is extended or adjusted under 35 U.S.C. 154(b) by 433 days.

(21) Appl. No.: 17/188,715

(22) Filed: Mar. 1, 2021

(65) Prior Publication Data

US 2021/0269350 A1    Sep. 2, 2021

(30) Foreign Application Priority Data

Feb. 28, 2020 (DE) ............. 10 2020 105 358.4
Sep. 4, 2020 (DE) ............. 10 2020 123 197.0

(51) Int. Cl.
*C03B 33/02* (2006.01)
*B23K 26/53* (2014.01)
*C03B 33/10* (2006.01)

(52) U.S. Cl.
CPC .......... *C03B 33/0222* (2013.01); *B23K 26/53* (2015.10); *C03B 33/102* (2013.01)

(58) Field of Classification Search
CPC .... C03B 33/0222; B23K 26/50; B23K 26/53; B23K 26/55; B23K 26/57
See application file for complete search history.

(56) References Cited

U.S. PATENT DOCUMENTS

| | | | | |
|---|---|---|---|---|
| 10,280,108 B2 * | 5/2019 | Bohme | ................ | B23K 26/53 |
| 10,620,444 B2 * | 4/2020 | Kumkar | ................ | B23K 26/066 |
| 10,830,943 B2 * | 11/2020 | Li | ................ | G02B 6/02338 |
| 11,130,701 B2 * | 9/2021 | Akarapu | ............ | B23K 26/0006 |
| 2013/0192305 A1 | 8/2013 | Black | | |
| 2013/0221053 A1 | 8/2013 | Zhang | | |
| 2013/0291598 A1 * | 11/2013 | Saito | ................ | B23K 26/0736 65/112 |
| 2015/0165548 A1 | 6/2015 | Marjanovic et al. | | |
| 2015/0166391 A1 | 6/2015 | Marjanovic | | |
| 2015/0166393 A1 | 6/2015 | Marjanovic | | |
| 2015/0299018 A1 | 10/2015 | Bhuyan | | |
| 2017/0203994 A1 | 7/2017 | Chen et al. | | |
| 2017/0252859 A1 * | 9/2017 | Kumkar | ................ | B23K 26/53 |
| 2018/0022631 A1 | 1/2018 | Förtsch | | |
| 2018/0093914 A1 | 4/2018 | Akarapu | | |
| 2018/0134604 A1 | 5/2018 | Ortner | | |
| 2018/0221988 A1 * | 8/2018 | Liu | ................ | B23K 26/0624 |
| 2018/0297887 A1 | 10/2018 | Spier | | |
| 2018/0345419 A1 | 12/2018 | Mikutis | | |

(Continued)

FOREIGN PATENT DOCUMENTS

| | | |
|---|---|---|
| CN | 107428588 | 12/2017 |
| CN | 107848860 | 3/2018 |

(Continued)

*Primary Examiner* — Sean M Michalski
(74) *Attorney, Agent, or Firm* — Ruggiero McAllister & McMahon LLC (57) ABSTRACT

The present disclosure relates to a method for at least section-wise separating a glass element into at least two glass sub-elements along a separation face and a glass sub-element which is manufactured and/or can be manufactured in particular by the method according to the disclosure.

20 Claims, 3 Drawing Sheets

(56) References Cited

U.S. PATENT DOCUMENTS

| | | |
|---|---|---|
| 2018/0370840 A1 | 12/2018 | Plapper |
| 2019/0002328 A1* | 1/2019 | Lezzi ................... C03B 27/044 |
| 2019/0300417 A1 | 10/2019 | Stute |
| 2019/0382300 A1* | 12/2019 | Bui ...................... B23K 26/032 |
| 2020/0017407 A1 | 1/2020 | Bello et al. |
| 2020/0254567 A1* | 8/2020 | Genier ................. B23K 26/066 |
| 2020/0376603 A1* | 12/2020 | Ortner .................. B23K 26/359 |
| 2020/0388538 A1 | 12/2020 | Swododa |

FOREIGN PATENT DOCUMENTS

| | | |
|---|---|---|
| CN | 107848861 | 3/2018 |
| CN | 108367962 | 8/2018 |
| CN | 108698900 | 10/2018 |
| CN | 109623171 | 4/2019 |
| DE | 102018126381 | 8/2019 |
| EP | 2781296 | 9/2014 |
| JP | 2017509568 | 4/2017 |
| WO | 2016154284 | 9/2016 |

* cited by examiner

METHOD FOR SEPARATING A GLASS ELEMENT AND GLASS SUB-ELEMENT

CROSS-REFERENCE TO RELATED APPLICATION

The present application claims the benefit of German Patent Application No. 10 2020 105 358.4, filed on Feb. 28, 2020, and German Patent Application No. 10 2020 123 197.0, filed on Sep. 4, 2020, each of which is herein incorporated by reference.

BACKGROUND OF THE PRESENT DISCLOSURE

1. Field of the Disclosure

The present disclosure relates to a method for at least section-wise separating a glass element into at least two glass sub-elements along a separation face and a glass sub-element which is in particular manufactured and/or can be manufactured with the method according to the disclosure.

2. Description of the Related Art

In glass production and processing, it is necessary to separate glass elements, such as glass plates, along a precisely defined separation face. Maintaining a predefined course of the separating face is of great importance, for example, for the intercompatibility of the glass sub-elements obtained after separation with other components.

In this respect clean separation face specifications often also have the requirement of a low roughness value and high strength of both the separation face and its edges. The reason for this is that glass sub-elements, the separation face and edges of which have a low roughness on the one hand and high strength on the other hand, are overall less sensitive to external influences. In this way it can be prevented, to a certain extent, wholly or at least partially that external damages to the separation face and its edges occur at all and that any existing defects propagate into the interior of the glass or initial defects due to the action of external stresses (mechanical, thermal, . . . ) lead to crack propagation and thus to a failure of the glass part.

Common methods for performing a separation process known to those skilled in the art are, for example, thermal laser beam separation (TLS), for example with a $CO_2$ laser, mechanical scribing, laser scribing or laser-based thermal cutting (laser based thermal shock cutting). The latter aims to continue an initial crack in the glass element with thermomechanical stresses, typically generated by a $CO_2$ laser. What all these methods have in common, however, is that with them the course of the cracks within the glass cannot be controlled or can only be controlled insufficiently. Especially if, as with mechanical scribing, a scratch line is only defined at the surface, the actual separation face extending in the depth area can only be predicted imprecisely. The same was observed for the laser processes mentioned, too, although their effect is principally not limited to the exterior of the glass material.

In the laser filamentation method, which is also known to the person skilled in the art, individual areas of the glass element to be separated are removed with a laser along the desired separation face. For example, a through hole is created at the desired points and the material is pressed into the side wall of the cylinder surface in order to create several cavities, so-called perforation holes, within the glass element. The pre-processed glass element is then finally separated by crushing, for example mechanically or by cleaving, along the perforation line formed by the perforation holes. Due to the perforation holes, however, the roughness value of the later separation face also increases. Above all, however, it was observed that with crushing, the tear line can deviate from the perforation line and can extend apart therefrom, which can lead to a separation face that does not correspond to the actual desired course. In particular, perforations introduced by lasers were identified as starting points for micro-cracks that continue from individual perforation holes into the glass element and can thus influence the course of the separation face.

Moreover, separation processes are known in which, following the laser filamentation, instead of crushing an etching process is carried out. In addition to the aspects associated with the laser process, there is also the fact that the necessary etching process is complex to prepare and carry out and thus relatively time-consuming and costly.

Ablation methods in which the glass material is iteratively removed with an ablation spot are also known to the person skilled in the art. However, such methods are often inefficient because they take a long time to carry out. To make matters worse, such a process often causes a large damage zone in the glass element.

In addition, when the glass elements are separated with the known methods, the separation faces and their edges have a comparatively high roughness and a comparatively low edge strength, which leads to a destabilization of the separation face and its edges and consequently to the increased susceptibility to damages described above.

It is therefore the object of the present disclosure to provide a method with which the disadvantages known from the prior art are overcome and which makes it possible to separate a glass element safely, reliably, and in an efficient and economical manner, wherein in particular an improved determinability of the separation face is enabled in the entire depth range and the resulting separation faces including their edges have a low roughness value and the edges moreover have a high strength. It is also an object of the present disclosure to provide a glass sub-element which has side surfaces or edges of high strength. Here, the term edge is a synonym for the separation face.

SUMMARY OF THE DISCLOSURE

The object is achieved by the disclosure according to a first aspect with a method for at least section-wise separating a glass element into at least two glass sub-elements along a separation face, comprising the steps of:
  providing the glass element comprising at least one glass body which comprises at least one glass material;
  controlling at least one line focus within the glass body in such a way that at least one tensile stress zone and/or at least two compressive stress zones are formed in the glass material along the separation face;
  introducing an initial damage to form at least one crack respectively in the glass material in the tensile stress zone and/or between the two compressive stress zones; and
  driving forward the crack within the glass material in the tensile stress zone or between the two compressive stress zones to form the separation face and separating the glass element along this separation face.

In another embodiment, the present disclosure provides a method for at least section-wise separating a glass element into two glass sub-elements along a separation face, comprising the steps of:
- providing the glass element, wherein the glass element comprises a glass body, wherein the glass body comprises a glass material;
- controlling a line focus within the glass body so that a tensile stress zone and/or two compressive stress zones are formed in the glass material along the separation face;
- introducing an initial damage to form a crack in the glass material in the tensile stress zone and/or between the two compressive stress zones;
- driving forward the crack within the glass material in the tensile stress zone or between the two compressive stress zones to form the separation face; and
- separating the glass element along this separation face.

In another embodiment, the present disclosure provides a glass sub-element manufactured by one of the above-described methods. The glass sub-element comprises at least one glass body which comprises at least one glass material and has a side surface, wherein stress values of the glass body in a plane at least section-wise have a compressive stress of from 1 MPa to 3000 MPa.

DETAILED DESCRIPTION OF THE DISCLOSURE

The disclosure is thus based on the surprising finding that the separation face within the glass material can be set in a particularly reliable manner and controlled over the entire depth range of the glass material by first forming a tensile stress zone in the glass material along the desired course of the later separation face. With an initial damage, a crack can then be formed and driven forward in this tensile stress zone, wherein the crack is "channeled" through this tensile stress zone in accordance with the predetermined course of the separation face. Since in this case compressive stress zones surround the tensile stress zone at least section-wise, it is effectively prevented that the crack leaves the tensile stress zone and spreads into the surrounding glass material. One tensile stress zone or two compressive stress zones (relative) can respectively be sufficient for crack guidance.

A line focus makes it possible to modify the entire depth area of the glass body so that the tensile stress zone and the compressive stress zones surrounding it are actually formed in the entire depth area. Due to the line focus, the energy of the light is particularly advantageously bundled onto a certain area, namely the depth area of the glass body, in which the modifications in the form of stress changes can then be introduced into the glass material in a particularly advantageous manner. Above all, however, the line focus can be formed everywhere in the glass body with unchanged quality and with constant properties and accordingly glass material can be modified everywhere in the glass body in a uniform manner.

It should be emphasized as particularly noteworthy that with the method according to the disclosure in principle any desired course of the separation face can be achieved as long as the different stress zones in the glass material can only be formed according to the desired course of the separation face. Thereby, however, very complex separation faces are possible, which cannot, or can only be achieved with great difficulty with conventional methods.

in conventional separation processes, which are based on the formation of cavities, random crack courses can result in that the separation does not take place along the actually intended perforation line, but entirely or partially also on the one or the other side parallel thereto. This is due to the specification of the stress zones according to the disclosure this is presently not the case.

Moreover, and especially for machining processes under clean room conditions, there is another particularly important advantage of the present disclosure that the entire separation process takes place without material removal and therefore does not cause any contamination of the material itself or in the environment. In the case of mechanical cutting, on the other hand, conchoidal fractures and/or splinters can arise, especially in the case of more complex separation face geometries.

It has also been shown, completely surprisingly, that the method according to the disclosure increases the strength of the separation face and its edges in some cases considerably compared to conventional separation methods. The inventors attribute this to the fact that the compressive stress zone quasi stabilizes the later separation face and thus obviously also prevents that damages to the separation face and edges occur or are able to continue into the interior of the glass material.

At the same time, the inventors also found that the roughness of the separation face and its edges can also be reduced with the method according to the disclosure compared to the results with previously known techniques. The inventors explain this by the fact that, due to the precise specification of the course of the separation face by the tensile stress zone, the separation of the glass element quasi proceeds more orderly such that fewer disturbances occur. As a result of this quasi-smooth separation the separation face is more even and therefore less rough.

It is also particularly advantageous in the method according to the disclosure that here the prestressing of the edges does not require the use of a liquid. Rather, the edges are already inherently prestressed. It is therefore to be noted in particularly preferred embodiments that the separation face and/or the edges of the separation face is/are inherently prestressed, in particular after the separation of the glass element along this separation face.

The proposed method thus contributes in many ways to an improved separation process and result, since both a significantly improved control over the course of the crack, namely by controlling the stress field, i.e. over the separation face, is achieved and the values of roughness and strength are improved, too.

At the same time, however, the method according to the disclosure can be integrated into existing facilities without any problems. Thus, in particular, methods for cutting glass plates and separating glass plate cutouts can be operated particularly efficiently and with particularly good results.

In other words, the disclosure could be summarized briefly and concisely so that an area in the glass material of a glass body can be modified by one or more continuous and/or discrete passes with the laser over the entire depth so that in a subsequent step the glass element can be separated along a precisely specified face.

The disclosure therefore enables that glass elements, such as glass plates or glass panes, even with great thicknesses from 0.6 mm, in particular with a thickness between 0.6 mm and 10 mm, preferably between 0.6 mm and 5 mm or between 3 mm and 5 mm, more preferably between 0.6 mm and 3 mm, even more preferably between 0.6 mm and 2 mm, or most preferably between 0.6 mm and 1.5 mm can be modified in the entire depth with a single pass.

For example, the glass elements can have a thickness of 1 mm to 50 mm, 1 mm to 40 mm, 1 mm to 30 mm, 1 mm to 20 mm or 1 mm to 15 mm. As an alternative or in addition, the glass elements have a thickness that is greater than 1 mm, greater than 5 mm or greater than 10 mm.

In other words, the method according to the disclosure enables in principle the processing of glass elements in a first step by producing modifications, for example tubular or cylindrical modifications. In a further step, the glass element can either be separated by applying mechanical and/or thermal stresses in the material or a closed outer contour can be generated. In principle, inner contours can also be produced, for example, by subsequent etching. Generally speaking, with the methods used in the further step damages in the tensile stress zone generated by the modifications are driven forward.

In a preferred embodiment, according to the first aspect of the disclosure it can alternatively or additionally be provided that the controlling of at least one line focus within the glass body is implemented in such a way that at least one tensile stress zone and two or more compressive stress zones are formed in the glass material along the separation face.

The person skilled in the art understands that if something takes place "along" the separation face, for example the formation of stress zones such as the compressive and/or tensile stress zones, the separation face does not (yet) necessarily have to be present at that point in time because it is only formed completely after the separation of the glass element into the two glass sub-elements. Instead, this is the planned separation area.

Therefore, in preferred embodiments, the method can alternatively or additionally further comprise the step of specifying a planned separation face of the glass element.

Everything that relates to the separation face in the not yet separated glass element then relates to the planned separation face. For example, the control of the line focus then includes that at least one tensile stress zone and/or at least two compressive stress zones are formed in the glass material along the planned separation face.

The person skilled in the art understands that the line focus has principally to be formed within the glass body. This includes cases in which the line focus is formed completely within the glass body, that is, no line focus is formed outside the glass body. The line focus is then preferably formed up to the surface of the glass body within the glass body, or the line focus is formed up to a certain distance, for example a distance of up to 2 µm, up to 1 µm or of up to 0.5 µm with respect to the respective surface within the glass body. However, cases in which the line focus is in fact formed within the glass body, but also extends outside thereof, are included, too. In fact, this is a preferred case.

The object is achieved by the disclosure according to a second aspect, a method for at least section-wise separating a glass element into at least two glass sub-elements along a separation face, comprising the steps of:

providing the glass element comprising at least one glass body which comprises at least one glass material;

controlling at least one line focus within the glass body in such a way that at least one tensile stress zone and at least two compressive stress zones are formed in the glass material along the separation face;

introducing an initial damage for forming at least one crack, respectively in the glass material in the tensile stress zone and/or between the two compressive stress zones; and driving forward the crack within the glass material in the tensile stress zone or between the two compressive stress zones for forming the separation face and separating the glass element along this separation face.

Reference can be made to the statements relating to the first aspect of the disclosure, which also apply here accordingly.

Therefore, according to the second aspect of the disclosure, in preferred embodiments the method can also alternatively or additionally comprise the step of specifying a planned separation face of the glass element.

As an alternative or in addition, it can also be provided according to the first and second aspects of the disclosure that (i) the compressive stress zones are at least section-wise spaced apart from one another; (ii) the tensile stress zone is at least section-wise respectively surrounded by at least one compressive stress zone; (iii) the controlling of the line focus comprises that at least one tensile stress zone and at least two compressive stress zones are formed in the glass material along the separation face, wherein the tensile stress zone is at least section-wise respectively surrounded by at least one of the two compressive stress zones; (iv) the controlling of the line focus comprises moving the glass element relative to the line focus, whereby the line focus can preferably be formed, in particular successively or continuously, at least at the different local areas; (v) the controlling of the line focus leads to a non-destructive formation of the stress zones, introduces modifications of the type "soft refractive index change" into the glass material, and/or comprises that the line focus is successively formed within different local areas of the glass material along the separation face and thereby the glass material of these local areas is respectively modified with regard to its local stress values, and wherein the spacing of the individual local areas is selected such that at least immediately adjacent local areas at least partially overlap, so that a continuous corridor of introduced modifications is formed in the glass material along the separation face, wherein preferably by the superimposition of the modifications of several local areas the different stress zones are formed, and/or wherein the individual local areas extend in at least one cross-sectional plane of the glass element along a straight path, which cross-sectional plane preferably extends parallel to at least one surface of the glass body which surface in particular comprises at least one of the cut edges of the separation face, and/or extends perpendicular to the optical axis of the light beam; and/or (vi) in at least one cross-sectional plane, preferably in all cross-sectional planes, parallel to the surface of the glass body, the local areas are formed circular and/or each two immediately adjacent local areas (a) have a center-to-center distance or a centroid-of-area-to-centroid-of-area distance which is smaller than the largest diameter of its extension, in particular the extension in the cross-sectional plane, and/or (b) a center-to-center distance or a centroid-of-area-to-centroid-of-area distance of 1000 nm or less, preferably 100 nm or less, more preferably 10 nm or less, and most preferably 1 nm or less.

Since the control of the line focus of a separate phase or of cracks in the glass body or the glass material takes place without a destruction in the sense of a cavity, it is particularly advantageously possible to separate the specification of the course of the separation face, namely by forming the tensile stress zone on the one hand and the implementation of the physical separation, namely by introducing and driving forward a crack into or within the tensile stress zone on the other hand, from one another and thereby to gain more control over the separation process compared to conventional methods.

In the case of previously known separation processes, for example, the specification of the course is already accompanied by a weakening of the material, which in turn can result in a poorly controllable damage to the remaining glass material. In the disclosure, however, it is possible to modify the glass material in such a way that no cracks, cavities or the like are introduced into the material.

The distance is preferably selected such that an overlap of the compressive stress zone in the central area along the planned separation face is avoided, wherein the distance corresponds to approximately twice the thickness of the compressive stress zone. Thus, mean distances of 20-200 nm are particularly preferred, but smaller distances are also possible. Modifications of the type "soft refractive index change" are non-destructive, i.e. modifications free of radial cracks, cavities or strong phase contrasts, which include significant changes in the state of stress. In the specialist literature, this type of modification is often called "soft refractive index change" because of the associated change in the refractive index.

The advantage of such modifications, see waveguides written with USP, USP laser welding, is less interference during the development of the line focus due to previous modifications.

By selecting different local areas of the glass material for forming the line focus and by modifying the stress values of the glass material accordingly within these local areas, the course and the formation of the stress zones can be specifically determined and controlled. In particular, discrete locations within the glass body or the glass material can be selected at which stress zones are to be introduced.

Since adjacent local areas then overlap, a continuous volume area is achieved in the glass body with corresponding stress values, that is to say a corridor. In particular, if the formation of the different stress zones, i.e. the one tensile stress zone and/or the two compressive stress zones, occurs as a result of the superposition of the stress modifications of adjacent local areas, despite several stress zones, only a single focus and only one pass are required to create them. Of course, it would also be conceivable that there are several foci of the line focus per local area. It is preferably possible that several foci are used to develop the modification, wherein in particular not all of these foci need to have the same geometry.

In order to form a straight separation face, the individual local areas can be selected so that they extend along a straight path.

The person skilled in the art understands that a local area of the glass material can in principle be larger than the area that the line focus occupies in the glass material. A local area is determined in that the glass material is modified, i.e. changed, with regard to its stress values through the line focus in this local area.

In preferred embodiments it can alternatively or additionally be provided that the control of the line focus includes that the line focus is guided continuously or discretely through the glass body.

The person skilled in the art knows that a continuous formation of the line focus is not possible in the case of a pulsed laser, but that the line focus formed with such a laser in the sense of the disclosure can very well be guided "continuously through the glass body". This then means nothing else than that the location at which the line focus is formed changes continuously.

In this respect, the inventors have recognized that the line focus can be moved and/or deflected in several ways in order to form the different stress zones along the separation face: for example, the line focus can be moved (quasi) continuously along the separation face. This enables a particularly uniform modification to take place. Here, the speed of movement should preferably be chosen so that the respective stress zones can be formed.

Or the line focus reaches individual discrete positions, i.e. local areas, in succession. As noted, the positions should be selected in such a way that at least adjacent local areas, in which the respective modifications occur, at least partially overlap. If, for example, the line focus has a round cross-section and radiates perpendicularly onto the surface, and thus the local areas are formed cylindrically in the glass material and accordingly the line focus represents a circular area on the surface of the glass body, in preferred embodiments the distance between adjacent positions along the separation face could be selected as less than the single diameter, preferably less than half the diameter, of the circle. This ensures that continuous compressive and tensile stress zones are formed in the glass material. For example, the single diameter could be 2 μm and half the diameter could be 1 μm. In the case of other line foci, which lead to other local areas and intersections with the (generally designed) surface of the glass body, the considerations apply accordingly and, moreover, the center-to-center distance can be replaced by the centroid-of-area-to-centroid-of-area distance.

Alternatively or in addition, it can also be provided in the first and second aspects of the disclosure that i. the line focus is formed by at least one light beam, in particular in the form of a laser beam, wherein the at least one laser beam preferably comprises an Airy beam profile and/or a Bessel beam profile at least in the area of the line focus;

ii. the light beam is designed at least in the area of the line focus in the form of a light beam with asymmetrical beam supply, in particular the energy is supplied asymmetrically, and preferably (a) is configured such that the centroid-of-area of the energy distribution lies in at least one plane perpendicular to the plane in which the beam propagation occurs, in the area of the previously unmodified glass material, (b) the partial beams of the light beam are only incident from half of a half room or part of it, (c) the partial beams of the light beam are only incident from directions that are selected in such a way that they do not propagate through areas of the glass body in which glass material has already been modified, (d) the light beam has at least one mirror plane parallel to the plane in which the beam propagation occurs, (e) the term "asymmetrical" is to be understood in the sense of "non-rotationally symmetrical", in particular other symmetries are not excluded and/or (d) the partial beams of the light beam in each plane parallel to at least one surface of the glass element and/or in each plane perpendicular to the optical axis of the light beam are incident only from one or only from two quadrants;
iii. the laser beam or beams are generated with at least one laser and the laser is operated in a pulsed mode, in particular in an ultra-short pulse laser mode;
iv. the laser has a wavelength of between 300 nm and 1200 nm, preferably 1064 nm, a pulse duration of between 0.1 ps and 100 ps, preferably between 0.1 ps and 10 ps, more preferably 1 ps or 8 ps, and/or, at least section-wise in the line focus a pulse energy of between nJ/mm and 200 µJ/mm, preferably between 10 nJ/mm and 100 µJ/mm or 110 µJ/mm, for point foci: 1 nJ to 100 nJ and for burst 1 nJ to 20 nJ; and/or
v. the line focus is formed entirely or partially with at least one phase mask, in particular comprising a cubic phase, with at least one microscope objective, with at least one 4f setup, with at least one asymmetrical beam supply and/or with a plurality of beam shaping elements, such as in particular cylindrical lenses, wherein in particular the beam shaping elements are selected and/or arranged such that the line focus is formed by coma, astigmatism and/or spherical aberration.

The inventors have recognized that the introduction of the stress zones into the glass body or into the glass material can be carried out in a particularly simple and efficient manner by use of conventional methods available on the market if a laser is used for this purpose, i.e. the light beams represent or include laser beams. The use of a laser beam or of several laser beams enables a high precision formation of the stress zones in the glass material. In addition, the optical components for laser systems are readily available. In addition, lasers enable to form even finest structures, in this case stress zones.

The laser is preferably an ultrashort pulse laser. In particular, the ultrashort pulse laser emits pulses with a pulse length of less than 20 ps, preferably 10 ps or less or 1 ps or less.

Preferably an ultrashort pulse laser beam with a line focus is used. If the pulse energy is chosen appropriately, no cavities are created in the glass material, but the glass material is modified with regard to its stress values. As a result, a tensile stress zone can be created which, for example, is surrounded on both sides by a compressive stress zone.

The person skilled in the art knows that a continuous formation of the line focus with a pulsed laser is not possible, but that the line focus formed with such a laser can "be moved continuously along the separation face" in the sense of the disclosure. This then means nothing else than that the location at which the line focus is formed changes continuously.

If the laser beam has an Airy or Bessel beam profile, a line focus can be obtained in a particularly efficient and simple manner. If the laser is operated in the pulse mode, the modification can be introduced into the glass material particularly efficiently. Another line focus, e.g. by use of a spherically aberrated lens, or (for several passes) also point foci, e.g. standard Gaussian focus, are conceivable.

An Airy beam or a Bessel beam can also be generated particularly easily and efficiently. For example, a Gaussian beam can serve as a starting point, which is then shaped into a Bessel beam by use of suitable optics, such as an axicon. For example, an Airy beam can result as an image of a beam with a cubic phase, which is generated either directly by a phase mask (DOE or SLM) or a setup with cylindrical lenses.

Pulse energy and/or pulse duration are preferably selected so that the glass material is not destroyed.

An asymmetrical beam supply leads to a more stable focus of the laser beam, in particular if it is achieved that partial beams have less strongly deviating optical path lengths on the way to the focus. The parallelism between the refractive index variation and the line focus and even more the symmetry are decisive. This is because if the change in the optical path length due to the variation in the refractive index is the same for all partial beams, the least disturbance results for the focus. The asymmetrical beam supply thus leads to a targeted modification of the glass material. Nevertheless, symmetrical beam shapes are also conceivable, for example that of the Bessel beam or the beam shape caused by a spherically aberrated optics/lens.

The person skilled in the art understands that in the case of an asymmetrical beam there is an asymmetrical arrangement of the partial beams, but of course, in principle, several beam paths are not used for the asymmetrical beam supply.

A light beam with asymmetrical beam supply fulfills the property of reduced or eliminated lateral partial beams in a particularly simple and effective way. For this purpose, the energy is no longer supplied to the focal line in a rotationally symmetrical manner along a conical surface (for example with beam-shaping optics), but rather asymmetrically. In other words, the light beam is shaped in such a way that, in contrast to conventionally used light beams, it does not include any parts of the light beam which can coincide with the already introduced modifications. This ensures that the light beam remains largely unaffected by already existing modifications and thus stress zones of particularly high quality can be formed, since the line focus can be formed with consistently high quality over the entire thickness range of the glass element.

In connection with the beam supply or energy supply, the term "asymmetrical" is understood here in the sense of "non-rotationally symmetrical". This means that other symmetries are not excluded. For example, the Airy beam has a mirror plane parallel to the plane in which its curved course lies.

If the energy is supplied asymmetrically, preferably designed in such a way that the centroid-of-area of the energy distribution is disposed in the plane perpendicular to the direction of beam propagation in the area of the previously unmodified glass material, it can particularly effectively prevented that the line focus is influenced by existing modifications.

The partial beams can propagate in half of a room half or a part thereof, whereby it is ensured that the partial beams always propagate in the glass area that has not yet been modified.

An Airy beam is particularly suitable for an asymmetrical/lateral beam supply. A Bessel beam is particularly suitable for a symmetrical/radial beam supply.

In preferred embodiments it is the case that a curved focus line is present. In such cases, the expert also speaks of an "accelerated light beam".

It has thus been shown that a large number of different beam shapes (e.g. Gauss, Bessel, spherically aberrated beam, etc.) can be used particularly well for the present disclosure, depending on the situation.

The ratio of beam diameter to scaling of the phase mask/aberration should be chosen so that the secondary maxima do not interfere with the process.

As an alternative or in addition, in the first and second aspects of the disclosure it can also be provided (i) that in the tensile and/or compressive stress zone the isobars of the first principal stress extend parallel to the separation face; (ii) that the two compressive stress zones are separated from one another, in particular extend parallel to and spaced apart from one another; and/or (iii) that in at least one cross-sectional plane, preferably in all cross-sectional planes, parallel to the surface of the glass body, at least section-wise, preferably everywhere, i. the tensile stress zone is arranged sandwich-like, in particular directly, between the two compressive stress zones; and/or ii. the tensile stress zone has a first thickness and the compressive stress zone has a second thickness, wherein the first and the second thickness respectively is preferably measured in the cross-sectional plane in a direction perpendicular to the main extension direction of the separation face and/or the maximum thickness of the compressive and tensile stress zones, respectively, is in the respective cross-sectional plane, and wherein in particular the first thickness is less than 50 μm, preferably less than 10 μm, more preferably less than 5 μm, even more preferably less than 2 μm, even more preferably less than 1 μm and most preferably between 0.1 μm and 1 μm, and/or the second thickness is less than 100 μm and/or greater than 1 nm, in particular between 10 nm and 1 μm.

Since the isobars of the first principal stress in the compressive and/or tensile stress zones extend parallel to the planned separation face, a particularly reliable "channeling" of the crack and thus a particularly reliable formation of the separation face according to the desired course can be achieved.

Because in this way the compressive stress zones surround the tensile stress zone sandwich-like, it is particularly well ensured that the crack extends within the tensile stress zone and does not lead out thereof. As a result, the propagation of the crack and thus the formation of the separation face according to the desired course can be particularly advantageously supported.

With the selection of suitable thicknesses for the compressive stress zones or the tensile stress zone, very good results with regard to the separation face can be achieved with minimal modification of the glass material.

In particular, if the first and the second thickness meet a preferred ratio relative to one another, a particularly well tuning of the extension of the two zone types is given, such that with an as little modification as possible, a good control over the separation face and good properties of both the separation face and the edge are provided. Preferred values for the first thickness are <50 μm, 10 μm, 5 μm, 2 μm, 1 μm, in particular 0.1 μm-1 μm. Preferred values for the second thickness are <100 μm (or greater), >1 nm, in particular 10 nm-1 μm.

The width of the tensile stress zone or the distance between the compressive stress zones should be as small as possible in order to define the location of the final separation face as precisely as possible. The thickness of the compressive stress zones, on the other hand, should be as large as possible in order to obtain a product that is as stable as possible (large prestressing depth). There is also a mutual dependency between the thickness of the compressive stress zone and the amplitude, which must be optimized (as is the case with prestressing glass).

Alternatively or in addition, it can also be provided in the first and second aspects of the disclosure that i. the initial damage is introduced into the glass material with a pulsed laser, preferably comprising a pulse energy between 80 μJ/mm and 300 μJ/mm and/or a pulse duration between 0.1 ps and 20 ps; ii. the crack is driven forward by mechanical crushing, by cleaving and/or by at least one ultrashort pulse laser (USP) process; and/or iii. the separation face extends and/or forms within the tensile stress zone and/or between two compressive stress zones.

If the initial damage is introduced into the glass material with a pulsed laser, the crack can be initiated in a spatially very targeted manner and with a pulse energy optimized for the application.

For the initial damage, the pulse energy is preferably 80 μJ/mm-300 μJ/mm at 0.1 ps-20 ps. If the crack is driven forward by mechanical crushing, by cleaving and/or by at least one ultra-short pulse laser (USP) process, this can be done by use of conventional and familiar methods that are readily available and easily controllable for this purpose.

In preferred embodiments, in the first and second aspects of the disclosure it can alternatively or additionally also be provided that the separation face extends and/or is formed within the tensile stress zone and/or between the two compressive stress zones formed by the controlled line focus.

As an alternative or in addition in the first and second aspects of the disclosure it can also be provided that the local areas extend in the glass material at least section-wise tubular and/or cylindrical and/or curved, in particular crescent in at least one cross-sectional plane, and/or preferably extend from the surface of the glass body to the surface of the glass body opposite the surface through the entire thickness range of the glass body enclosed between the two surfaces.

In preferred embodiments the local areas extend in a direction perpendicular to the main extension direction of the separation face.

As an alternative or in addition in the first and second aspects of the disclosure it can also be provided that the glass element, in particular the glass body, is formed at least section-wise and/or completely disk-shaped and/or the glass material comprises at least partially silicate glass, such as aluminosilicate glass and/or borosilicate glass.

The object is achieved by the disclosure according to a third aspect in that a glass sub-element is proposed, which in particular is manufactured and/or can be manufactured by a method according to the first and/or second aspect of the disclosure, comprising at least one glass body which comprises at least one glass material and has at least one side surface, wherein the stress values of the glass body in at least one plane at least section-wise, preferably completely, correspond to a compressive stress, preferably from 1 MPa to 3000 MPa, in particular from 50 MPa to 700 MPa, wherein the plane preferably extends parallel to the side surface.

The disclosure is thus based on the surprising finding that a high strength can be achieved for a side surface and its edges by providing quasi within the glass material "behind" the side surface a plane in which the stress values of the glass body correspond to a compressive stress.

The inventors explain this positive property with the fact that the compressive stress in the glass body stabilizes the side surface from the inside and thus contributes to an improved edge strength.

It is noteworthy that the areas with compressive stress do not have to be disposed directly on the side surface or directly behind it, but also compressive stresses in zones that, so to speak, only occur slightly offset to the inside, lead to a significant improvement in edge strength. Nevertheless, it is fundamentally advantageous if the volume close to the side surface is also set under compressive stress.

The tensile stress zone is preferably quite wide compared to the compressive stress zone. The side surface is preferably disposed completely in the compressive stress zone.

Alternatively or in addition in the third aspect of the disclosure it can also be provided that the stress values in the side surface of the glass body at least section-wise correspond to a tensile stress, the plane lies in a volume area in which the stress values of the glass body correspond to a compressive stress and/or in the plane the isobars of the first principal stress of the glass body extend parallel to the side surface.

A particularly preferred setup is given when in the plane the isobars of the first principal stress of the glass body extend parallel to the side surface. This is a desirable (intermediate) product property.

As an alternative or in addition in the third aspect of the disclosure it can also be provided that the edge strength of the glass sub-element, in particular of the glass body, along the side surface is greater than 100 MPa and/or is constant over the entire side surface.

The highest possible edge strength leads to a particularly stable and therefore easy to use glass sub-element.

As an alternative or in addition in the third aspect of the disclosure it can also be provided that the side surface comprises at least section-wise a, preferably average, surface roughness with a roughness depth RZ of 5 nm to 10 µm, in particular 0.1 µm-5 µm.

Surprisingly, a low surface roughness supports the high edge strength brought about by the compressive stress zone and thus leads to a particularly stable and therefore easy to use glass sub-element.

Alternatively or additionally in the third aspect of the disclosure it can also be provided that the side surface is flat and/or curved, in particular comprises, preferably in at least one cross-sectional plane perpendicular to the side surface, at least section-wise a parabolic and/or circular course and/or a course according to an equation of the fourth degree.

In the case of a curved side surface, the forces acting on it can be diverted particularly advantageously and thus the stability of the side surface and its edges can be increased.

EXAMPLES

Figure 1:
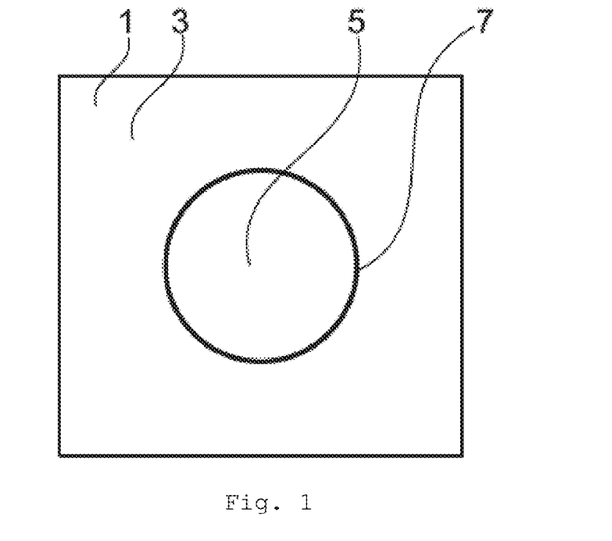
FIG. 1 shows a stress pattern for a single (discrete) modification in a glass element.

Referring to the drawings, FIG. 1 shows a rectangular, disk-shaped glass element 1 in a plan view. The glass element 1 comprises a glass body 3 which comprises a glass material.

By forming a line focus within the glass body 3 which extends perpendicular to the surface (which extends parallel to the plane of the drawing in FIG. 1) of the glass element 1, the glass material has been modified with regard to its stress values in the entire depth range (which extends perpendicular to the plane of the drawing in FIG. 1). I.e., a tensile stress zone 5 and a compressive stress zone 7 are formed (in every cross-sectional plane parallel to the plane of the drawing in FIG. 1 in the same way), wherein the tensile stress zone 7 is surrounded by the compressive stress zone 5. In the inside there must be a tensile stress zone, which is surrounded by a compressive stress zone. This is because with higher pulse energies (not considered here) an (open) channel is created, the walls of which are under pressure from the displaced material. According to the disclosure, however, no displacement of material occurs.

Since the line focus has a circular cross-section, the tensile stress zone 5 is also circular and the compressive stress zone 7 is annular and arranged concentric and directly adjoining the tensile stress zone 5.

With regard to the disclosure, the (volume) area with the compressive and tensile stress zones 5, 7 in the glass body 3 would correspond to a local area according to the disclosure.

Figure 2:
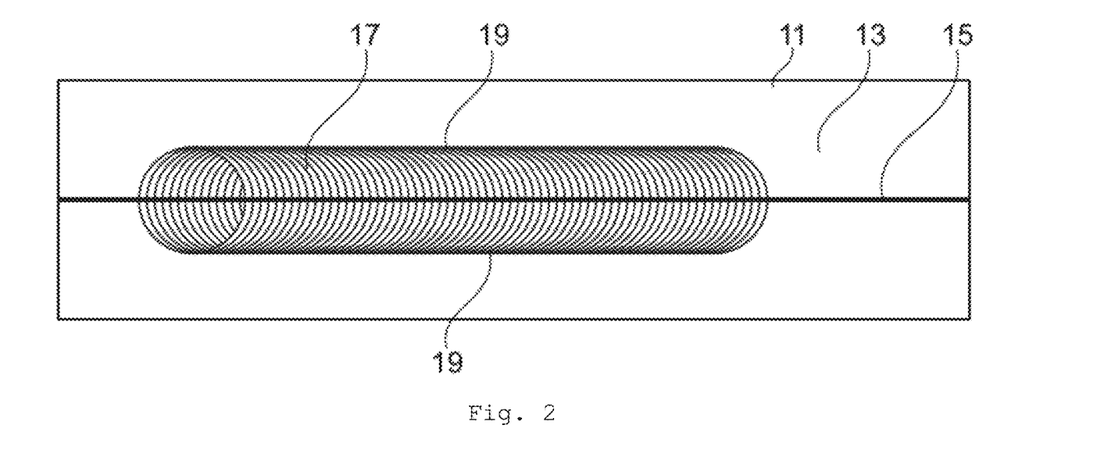
FIG. 2 shows a glass element with zones of different stress as superimposition of (discrete) modifications.

FIG. 2 shows a rectangular, disk-shaped, glass element 11 in a plan view. The glass element 11 comprises a glass body 13 which comprises a glass material.

A line focus was controlled within the glass body 13 in such a way that at least one tensile stress zone 17 and at least two compressive stress zones 19 are formed in the glass material along the (planned) separation face, the course of which is perpendicular to the plane of the drawing in FIG. 2 and which is to be indicated by the edge 15, wherein the tensile stress zone 17 is respectively surrounded at least section-wise by at least one of the two compressive stress zones 19.

Here, the control of the line focus includes that the line focus is formed successively within different local areas of the glass material along the (planned) separation face and thereby the glass material of these respective local areas is modified with regard to its local stress values. To this end, the glass element 11 is moved relative to the line focus, as a result of which the line focus can be formed successively within the different local areas. In each local area the line focus then generates a stress pattern as described with reference to FIG. 1.

In this case, the distance between the individual local areas is selected such that at least immediately adjacent local areas at least partially overlap, so that a continuous corridor of modifications introduced in the glass material is formed along the (planned) separation face. Here, specifically, two respective immediately adjacent local areas have a center-to-center distance that is smaller than the largest diameter of the extension of the local areas in the cross-sectional plane parallel to the plane of the drawing in FIG. 2. With the superimposition of the modifications of several local areas finally the different stress zones are formed along the (planned) separation face. In the plane of the drawing in FIG. 2 and in all cross-sectional planes parallel thereto, the tensile stress zone 17 is sandwiched directly between the two compressive stress zones 19.

In FIG. 2, the corridor extending continuously through the glass body 13 in the form of the stress zones 17 and 19 can be clearly seen.

Subsequently, an initial damage to form a crack can be introduced within the tensile stress zone 17 and this can be driven forward therein so that the glass element 11 can be separated into two glass sub-elements at the (planned) separation face with a course according to the edge 15.

It should be emphasized that in FIG. 2 for purposes of illustration the stress zones 17, 19 are not shown formed over the entire width area, i.e. not along the entire edge 15, of the glass element 11, which is of course necessary to separate the glass element 11.

In principle, the line focus could represent a line focus of a laser beam, wherein the laser beam is designed in the form of an Airy beam.

Figure 3A:
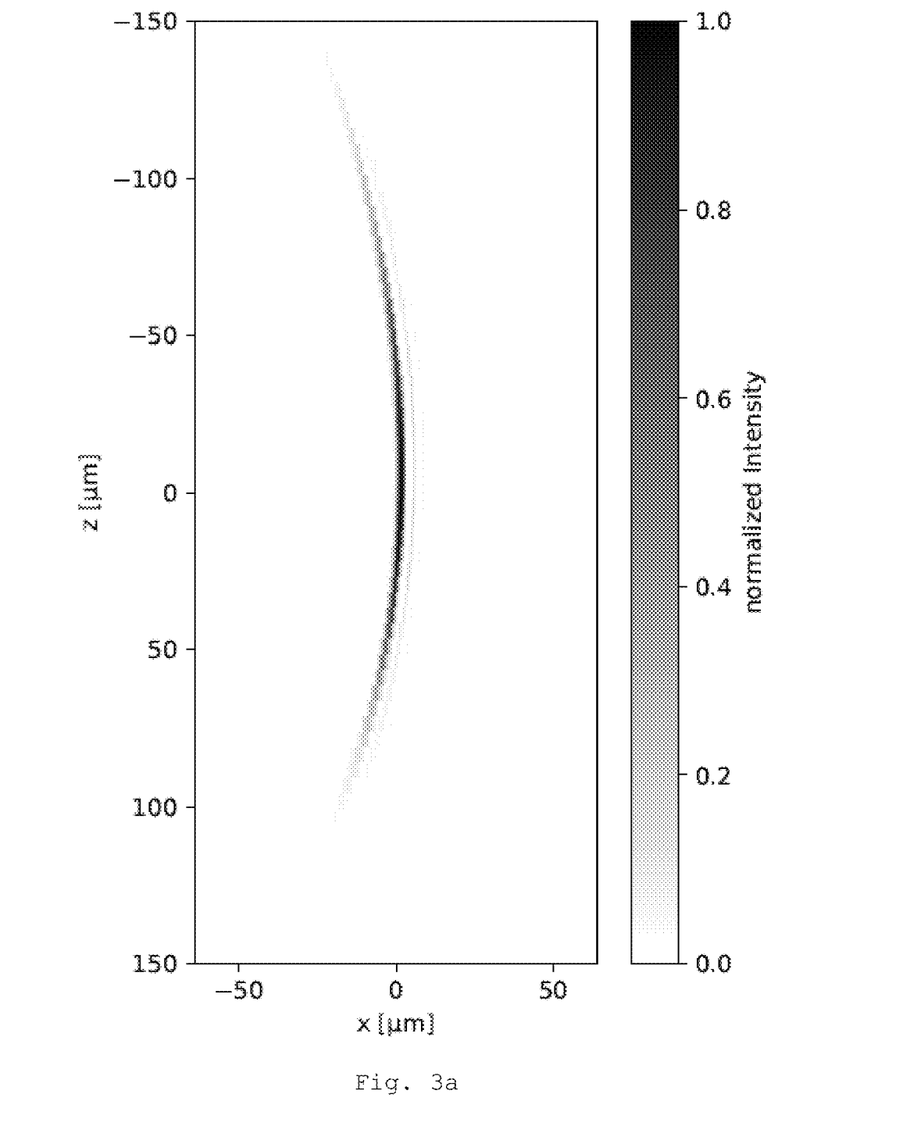
FIG. 3a shows a first cross-sectional view of a ray tracing model of an Airy beam in a first cross-sectional plane.

FIG. 3a shows a first cross-sectional view of a ray tracing model of an Airy beam in a first cross-sectional plane. Here, the first cross-sectional plane extends parallel to the separation face of a hypothetical (e.g. cuboid) glass element. This means that the separation face lies in the x-z plane (at y=0) and intersects the complete, curved line focus. In FIG. 3a the line focus has its maximum intensity in its center, that is to say in the area around the point (x=0; z=0). Corresponding to the curved line focus, the local areas also extend equally curved. In the method according to the disclosure, adjacent local areas follow one after the other in the positive x-direction.

Figure 3B:
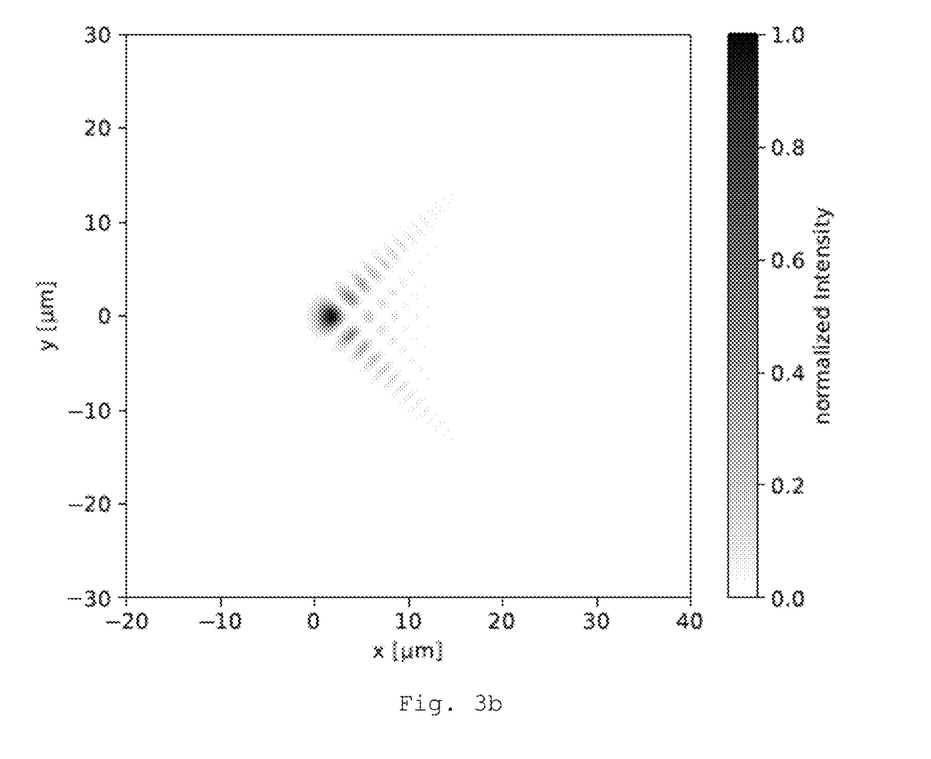
FIG. 3b shows a second cross-sectional view of the ray tracing model of the Airy beam in a second cross-sectional plane.

FIG. 3b shows a second cross-sectional view of the ray tracing model of the Airy beam in a second cross-sectional plane. The second cross-sectional plane is perpendicular to the first cross-sectional plane. For example, this could be the surface of the hypothetical (cuboid) glass element, or a plane extending parallel thereto within the glass element. In the method according to the disclosure, adjacent local areas follow one after the other in the positive x-direction.

The cross-sectional plane in FIG. 3b intersects the line focus of the laser beam in the area around the point (x=0; y=0). In the area of positive x values, moreover, the lateral partial beams of the laser beam can be seen. As can also be seen from FIG. 3b, the Airy beam there has no lateral components towards negative x values. Instead, the beam is supplied asymmetrically in accordance with a preferred embodiment of the method according to the disclosure, that is to say in the situation in FIG. 3b only from sections of a half room with positive values. As a result, when the line focus is relatively shifted in the direction of the positive x-axis, no partial beams occur in the area of previous modifications.

As already mentioned, the term "asymmetrical" is to be understood in the sense of "non-rotationally symmetrical" in connection with the beam supply or energy supply. This means that other symmetries are not excluded. For example, the Airy beam described herein has a mirror plane parallel to the x-z plane, as can be seen from FIG. 3b.

The features disclosed in the preceding description, in the claims and in the drawings can be essential for the disclosure in its various embodiments both individually and in any combination.

LIST OF REFERENCE SYMBOLS 1 glass element
3 glass body
5 (tensile) stress zone
7 (compressive) stress zone
11 glass element
13 glass body
15 (planned) edge
17 stress zone
19 stress zone

The invention claimed is:

1. A method for separating at least a portion of a glass element along a separation face, comprising the steps of:
   providing the glass element that comprises a glass body of a glass material;
   controlling a line focus of a light beam within the glass body to form a tensile stress zone and two compressive stress zones in the glass material along the separation face, wherein the tensile stress zone is between the two compressive stress zones;
   introducing an initial damage to form a crack in the glass material in the tensile stress zone;
   propagating the crack within the glass material between the two compressive stress zones to form the separation face; and
   separating the glass element along the separation face.

2. The method according to claim 1, wherein at least one of the following conditions (i) to (iv) applies:
   (i) the tensile stress zone is surrounded by the two compressive stress zones;
   (ii) the controlling the line focus comprises moving the glass element relative to the line focus so that the line focus is formed at different local areas of the glass body;
   (iii) in a cross-sectional plane, parallel to a surface of the glass body, local areas are formed circular and/or each two immediately adjacent local areas have a center-to-center distance or a centroid-of-area-to-centroid-of-area distance which is smaller than the largest diameter of its extension, and/or
   (iv) in a cross-sectional plane, parallel to a surface of the glass body, local areas are formed circular and/or each two immediately adjacent local areas have a center-to-center distance or a centroid-of-area-to-centroid-of-area distance of 1000 nm or less.

3. The method according to claim 2, wherein at least one of the following conditions (i) to (x) applies:
   (i) the line focus is formed by at least one light beam comprises an Airy beam profile and/or a Bessel beam profile in at least an area of the line focus;
   (ii) the light beam has asymmetrical beam supply and is configured such that a centroid-of-area of an energy distribution lies in at least one plane perpendicular to the plane in which a beam propagation occurs in the area of a previously unmodified glass material;
   (iii) the light beam has asymmetrical beam supply and partial beams of the light beam are only incident from half of a half room or part of it;
   (iv) the light beam has asymmetrical beam supply and partial beams of the light beam are only incident from directions that are selected in such a way that they do not propagate through areas of the glass body in which glass material has already been modified;
   (v) the light beam has asymmetrical beam supply and the light beam has a mirror plane parallel to the plane in which the beam propagation occurs;
   (vi) the light beam has a beam supply that is only asymmetrical in that the beam supply is non-rotationally symmetrical;
   (vii) the light beam has asymmetrical beam supply and partial beams of the light beam in each plane parallel to at least one surface of the glass element and/or in each plane perpendicular to an optical axis of the light beam are incident only from one or two quadrants;
   (viii) the light beam is generated with at least one laser and operated in a pulsed mode;
   (ix) the light beam has a wavelength of between 300 nm and 1200 nm, a pulse duration of between 0.1 ps and 100 ps, and/or, a pulse energy in the line focus of between 10 nJ/mm and 200 µJ/mm, for point foci: 1 nJ to 100 nJ; and
   (x) the line focus is formed at least partially with a phase mask, with a microscope objective, with a 4f setup, with an asymmetrical beam supply and/or with a plurality of beam shaping elements, wherein the beam shaping elements are selected and/or arranged such that the line focus is formed by coma, astigmatism and/or spherical aberration.

4. The method according to claim 2,
wherein the local areas extend in the glass material in a tubular shape in at least one cross-sectional plane, and/or extend from the surface of the glass body to the surface of the glass body opposite the surface through an entire thickness of the glass body enclosed between the two surfaces.

5. The method according to claim 2,
wherein the local areas extend in the glass material in a curved shape in at least one cross-sectional plane, and/or extend from the surface of the glass body to the surface of the glass body opposite the surface through an entire thickness of the glass body enclosed between the two surfaces.

6. The method according to claim 2, wherein at least two of the conditions (i) to (iv) apply.

7. The method according to claim 2, wherein the light beam is generated with a laser operated in an ultra-short pulse laser mode.

8. The method according to claim 1,
wherein the controlling the line focus comprises a non-destructive formation of the tensile and compressive stress zones.

9. The method according to claim 1,
wherein the controlling of the line focus comprises successively forming the line focus within different local areas of the glass material along the separation face so that the glass material of the local areas has local stress values that are modified, and
wherein the local areas of the glass material have a spacing such that at least immediately adjacent local areas of the glass material at least partially overlap so that a continuous corridor of introduced modifications is formed in the glass material along the separation face.

10. The method according to claim 9,
wherein different stress zones are formed by superimposition of the introduced modifications of several local areas.

11. The method according to claim 10,
wherein the local areas extend in a cross-sectional plane of the glass element along a straight path,
wherein the cross-sectional plane extends parallel to a surface of the glass body, and
wherein the surface comprises at least one edge of the separation face and/or extends perpendicular to an optical axis of the light beam.

12. The method of claim 9, wherein the tensile stress zone has a first thickness and the two compressive stress zones have a second thickness, and wherein the first thickness is less than 50 μm and greater than 1 nm, and/or the second thickness is less than 100 μm and greater than 1 nm.

13. The method according to claim 1, wherein at least one of the following conditions (i) to (iiv) applies:
(i) isobars of a first stress extend parallel to the separation face in the tensile stress zone and/or the compressive stress zone;
(ii) the two compressive stress zones are present and are separated from one another;
(iii) in a cross-sectional plane parallel to a surface of the glass body, the tensile stress zone is present and is arranged in a sandwich between the two compressive stress zones; and
(iv) in a cross-sectional plane parallel to the surface of the glass body the tensile stress zone is present and has a first thickness and the two compressive stress zones have a second thickness, wherein the first and the second thicknesses are measured in the cross-sectional plane in a direction perpendicular to an extension of the separation face and/or the maximum thickness of the compressive and tensile stress zones is in the respective cross-sectional plane.

14. The method according to claim 1, wherein at least one of the following conditions (i) to (iii) applies:
(i) the initial damage is introduced into the glass material with a pulsed laser, comprising a pulse energy between 80 μJ/mm and 300 μJ/mm and/or a pulse duration between 0.1 ps and 20 ps;
(ii) the crack is driven forward by mechanical crushing, by cleaving and/or by at least one ultrashort pulse laser (USP) process; and
(iii) the separation face extends and/or forms within the tensile stress zone and/or between the two compressive stress zones.

15. The method according to claim 1,
wherein the glass element is formed in a disk shape and/or the glass material comprises silicate glass.

16. The method according to claim 15, wherein the silicate glass is aluminosilicate glass and/or borosilicate glass.

17. The method according to claim 1, further comprising forming the line of focus with a light beam.

18. The method according to claim 17, wherein the light beam has an airy beam profile along the line of focus.

19. The method according to claim 1, wherein the glass element is a glass plate having a thickness from 0.6 mm to 50 mm.

20. The method according to claim 1, wherein the propagating is by mechanical crushing, by cleaving and/or by at least one ultra-short pulse laser (USP) process.

* * * * *